United States Patent
Ryynänen et al.

(10) Patent No.: US 8,206,113 B2
(45) Date of Patent: Jun. 26, 2012

(54) METHOD AND APPARATUS FOR CONVERTING MARINE WAVE ENERGY BY MEANS OF A DIFFERENCE IN FLOW RESISTANCE FORM FACTORS INTO ELECTRICITY

(76) Inventors: Seppo Ryynänen, Kuusankoski (FI); Mikko Ryynänen, Vantaa (FI)

( * ) Notice: Subject to any disclaimer, the term of this patent is extended or adjusted under 35 U.S.C. 154(b) by 571 days.

(21) Appl. No.: 12/303,186

(22) PCT Filed: Jun. 2, 2006

(86) PCT No.: PCT/FI2006/050232
§ 371 (c)(1),
(2), (4) Date: Dec. 2, 2008

(87) PCT Pub. No.: WO2007/141367
PCT Pub. Date: Dec. 13, 2007

(65) Prior Publication Data
US 2009/0189395 A1    Jul. 30, 2009

(51) Int. Cl.
B63H 1/16    (2006.01)
B63H 1/38    (2006.01)
B64C 11/00    (2006.01)
B64C 27/20    (2006.01)
F01D 5/22    (2006.01)
F03D 11/00    (2006.01)
F03D 3/00    (2006.01)
F03D 3/04    (2006.01)
F03D 3/06    (2006.01)
F03B 7/00    (2006.01)
F03B 17/06    (2006.01)

(52) U.S. Cl. .............. 416/176; 416/177; 416/197 A; 416/1; 416/85; 415/3.1; 415/72; 415/75; 415/7; 415/906

(58) Field of Classification Search .................. 416/176, 416/177, 197 A, 1, 85; 415/3.1, 72, 75, 7, 415/906
See application file for complete search history.

(56) References Cited

U.S. PATENT DOCUMENTS

| 1,697,574 A | 1/1929 | Savonius |
| 4,221,538 A | 9/1980 | Wells |

(Continued)

FOREIGN PATENT DOCUMENTS

GB    2139294 A    11/1984

(Continued)

OTHER PUBLICATIONS

International Search Report dated Feb. 16, 2007, issued in corresponding international application No. PCT/FI2006/050232.

(Continued)

*Primary Examiner* — David Zarneke
(74) *Attorney, Agent, or Firm* — Ostrolenk Faber LLP

(57) ABSTRACT

The invention relates to a method and apparatus for gradually converting marine wave energy into electricity. The energy reserve provided by wind power holds enough energy for the needs of the entire mankind. The invention provides an efficient means of putting this energy reserve to practical use. Mounted on a rotating power shaft is a pair of form parts, the convex and concave shape, especially the round-pointed open V-shape of which reverses its orientation by 180 degrees, i.e. turns from convex to concave, whenever the power shaft makes a rotation of 180 degrees. The circular motion of water occurring in a wave drives such a turbine effectively while the wave dies out. The pair of convex and concave form parts extends helically around the power shaft, whereby water currents in all directions, which come to contact with the pair of form parts, produce a rotative moment.

27 Claims, 7 Drawing Sheets

U.S. PATENT DOCUMENTS

| | | |
|---|---|---|
| 4,733,628 A | 3/1988 | Baughman |
| 5,787,832 A | 8/1998 | Spinka |
| 6,622,483 B2 | 9/2003 | Denniss |

FOREIGN PATENT DOCUMENTS

| | | |
|---|---|---|
| GB | 2386161 A | 9/2003 |
| GB | 2412948 A | 10/2005 |
| JP | 55-164781 A | 12/1980 |
| JP | 56-006076 A | 1/1981 |
| JP | 2002-310051 A | 10/2002 |
| JP | 2004-520519 A | 7/2004 |
| JP | 2004-324518 A | 11/2004 |
| JP | 2005-320868 A | 11/2005 |
| WO | WO 96/38667 A1 | 12/1996 |

OTHER PUBLICATIONS

Office Action mailed Sep. 13, 2011 in corresponding Japanese Application No. JP 2009-512627, along with English translation thereof.

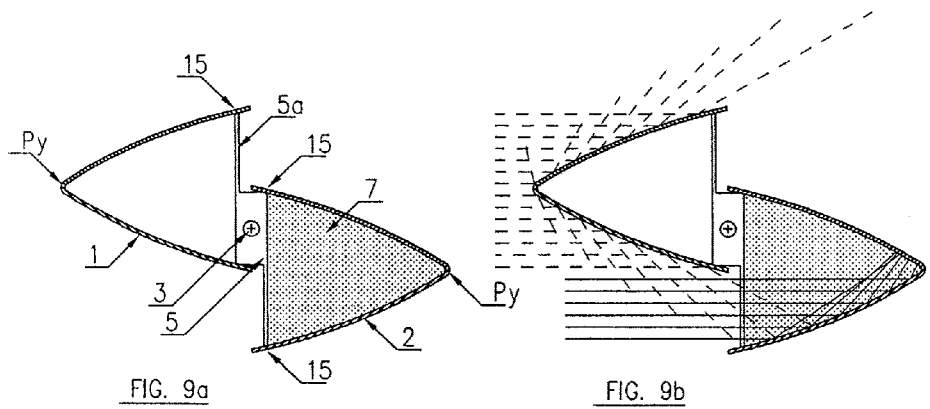
FIG. 9a FIG. 9b
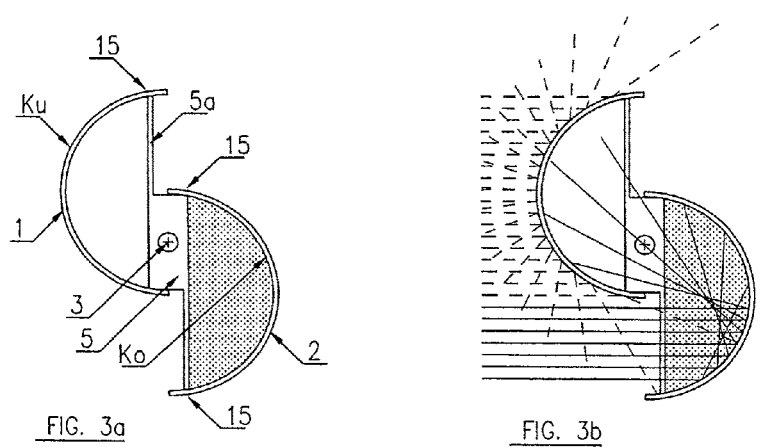
FIG. 3a FIG. 3b
FIG. 5
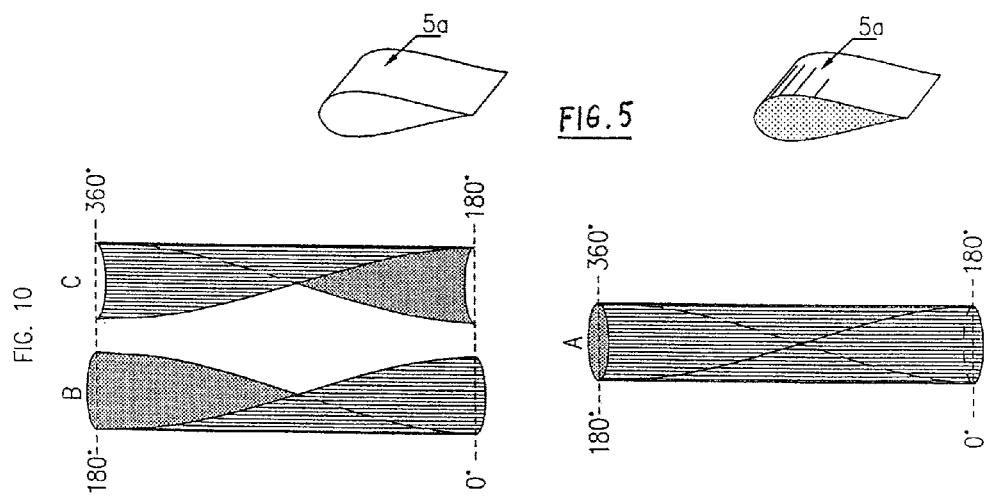
FIG. 10

METHOD AND APPARATUS FOR CONVERTING MARINE WAVE ENERGY BY MEANS OF A DIFFERENCE IN FLOW RESISTANCE FORM FACTORS INTO ELECTRICITY

CROSS REFERENCE TO RELATED APPLICATIONS

The present application is a 35 U.S.C. §371 National Phase conversion of PCT/FI2006/050232, filed Jun. 2, 2006. The PCT International Application was published in the English language.

FIELD OF THE INVENTION

The invention relates to the conversion of alternating marine wave motion by means of a difference in flow resistance form factors gradually into electricity by a pair of form parts, extending helically 180+180 degrees around a shaft and opening gradually to the force of flow or oscillatory motion.

Specifically, the invention relates to a method and apparatus for recovering the mechanical kinetic and centrifugal energy of oscillating liquid water molecules in massive sea waves conveniently in various directions and even from various depth levels directly in the form of electricity, e.g. from a floating and rolling generator platform in an environmentally friendly and economical manner. The method does not require bulky and expensive structures or equipment, nor transformations of energy into other forms, as use is made directly of hydraulic forces present in waves of water in the form of natural oscillatory motion, current, pressure and inertial forces, as well as in the form of hydrostatic potential energy in a structurally solid rotating turbine. Differences in flow resistance caused by unequal form factors of interconnected form parts are utilized on various sides of a power shaft for creating a rotative force for the shaft, generally without major currents parallel to the shaft. Hence, the sea water sort of passes through a turbine as the energy is recovered by rotating form parts and transferred by way of a power shaft to a generator, in which the mechanical energy is converted into electric power without creating significant emissions. The Kyoto treaty against emissions of carbon dioxide and nitrogen dioxide can be conveniently fulfilled with the invention in maritime regions, regarding e.g. the production of energy and generally the energy supply for society, as well as waterway and rail traffic. At the same time, air intermixed with water can be removed centrifugally, especially from water layers near the surface and can be put to practical use, e.g. for preventing the freezing of harbours or sea lanes by means of air bubbles of warmer water rising from deep, e.g. from porous air pipes extending on the seabed in parallel relationship with the sea lane.

BACKGROUND OF THE INVENTION

The working platform can be provided, for example, by using a pontoon or raft floating and rolling on the sea surface, which is secured e.g. to another pontoon or anchors for holding the power stator or optionally the rotor of a generator roughly in its orientation and stationary even in deep water. This function can also be performed by means of parachute-like drag anchors of a canvas material, which brace themselves e.g. with metal-stranded wires or ropes in a large and less mobile or quiescent body of water. The drag anchors may also serve as mounting brackets during work.

In a wave of sea water, the force, pressure and potential energy of oscillatory motion can be taken up e.g. by helical double-faced, concave (Ko), generally continuous channel surfaces, extending through 180 degrees or half a circle around a shaft and being at least partially open to flow or current. Opposite to the concave channel surface presently taking up the current, on the other side of the rotating shaft is provided a convex (Ku) vane surface. Each vane is concave in its surface facing the shaft and convex in its opposite or outer surface. The vanes are open V- or A-shaped vanes, which are usually arcuate in cross-section. The vanes are located at a distance from each other, with the concave sides facing each other, and are slightly rounded at the sharp end. The pairs of vanes complementary to each other enable transmission of a rotative force to the power shaft of a rotor, which is generally set between the vanes. By way of braces, which are streamlined in the moving direction of sea water, i.e. which provide a low resistance, the inertial and centrifugal forces of a wave are transferred from form parts to a rotating power shaft which is preferably horizontal but can also be vertical. The concave surface takes up the current and pressure force during rotation, while the convex surface rotates simultaneously also around the shaft. Various components of force and energy, e.g. motion, speed, inertia, pressure, and potential, find themselves in a complicated interaction at the surface of a turbine in keeping with natural laws. These can be combined in the power shaft of a rotor as the arcuate and axially often slightly inclined vane surface is forced to rotary motion in response to inertial forces introduced by a wave or a mass of current or becomes generally exposed to the propulsion of centrifugal forces of water. The electromagnetic resistance force of a generator is generally inclined to work against all kinetic forces of a water wave applied to the vanes of the apparatus, but the resistance force gives in to the forces of a water wave acting on the vanes and converting into electricity in the generator's winding.

The swelling of the sea, its oscillating field or current are perturbed by many factors. Even in water waves, many different oscillations will be summed up in longitudinal, lateral and vertical directions as a result of reflection and deflection.

Marine waves carry a very high total accumulation of energy all the time. This energy reserve, i.e. the marine "accumulator", is currently almost unused, despite the enormous demand. In fact, the supply of energy is presently practiced in an unnecessarily expensive and polluting fashion, e.g. by burning oil, coal, wood, waste or by means of nuclear power with the resulting radiation and waste.

Indeed, it would only take about 2% of the marine wave energy to produce enough electricity for the whole world's energy demand. The power of ocean swells at its peak is approximately 100 kW/m of wave front or shoreline. Commonly existing powers along seasides are about 10-50 kW/m in non-freezing regions. The heaving sea can also be maintained in energy production during winter by means of air, as warm heavy water is brought from deep up to the surface along with air. Sea lanes, in particular, can be maintained clear of solid ice and making waves in the wind by means of air bubbles rising from a warmer deeper layer and partially also by warmer water rising from deep and having a high thermal capacity. After all, every individual moving wave mass represents a small energy reserve or a mechanical accumulator.

The mechanism sustaining sea waves comprises principally wind of unstable directions and force and occasionally underwater earthquakes in the form of a tsunami. In the latter, the body of water advancing in a pressure wave rises to form a high and long wave as the overlying air offers little resistance to the rising wave. Indeed, the horizontal and vertical motion of water molecules is generally most intense near the surface, but becomes slower as the depth increases and the moving body of water grows in thickness. Due to the instability of this source of energy, the recovery and storage of energy has thus far been difficult and expensive. The large water masses of waves appear to be moving and "pumping" back and forth constantly in the sea. The energy of marine waves can be harnessed for the production of electric power instead of building more nuclear power facilities, for example. The energy production process according to the invention eliminates nearly all emissions and waste products over the entire life cycle of the equipment.

This invention enables utilizing a pair of open double-faced concave and convex form parts connected to a power shaft, said form parts extending helically through 180 degrees and gradually opening with respect to the upstream direction. The convex surface confronting the flow or current transforms gradually in the current into a concave surface taking up the current and force on the downstream side of the same vane panel. The concave channel surface open to the current of water constitutes, as seen in the downstream direction, usually about 30 . . . 40% of the projected side area of a turbine, the rest being generally covered on the upstream side by the ridge-shaped convex vane of the turbine. The current is reflected sideways, e.g. onto the concave surface, by the convex surface. Along the counterflow section of a turbine, the rotative concave vane is shielded by the convex vane until the functions thereof are gradually reversed over the helical extent of 180 degrees.

A spiral-shaped helical body, lying within a current or oscillation, has always at least a portion of the concave surface in the process of taking up forces of current from all directions and of establishing a block or barrier to the current repeatedly over every cycle and of transferring the pressure or kinetic force of a wave or oscillation through an opening or slot 4 between the form parts by way of braces 5*a* or support plates 55 to a rotating shaft 3.

The improvement of the invention is primarily focused on upgrading the use and enhancing the efficiency of currents and multi-directional oscillatory motions occurring in waves of water.

According to the invention, the improvement is provided in such a way that a turbine, rotating e.g. in a directionally unstable sea current or in oscillatory motions, uses its concave surface contour to take up even multi-directional currents and a pressure effect while turning helically around a nearly stationary or slowly moving shaft.

In this application, the term "sea" is used, for example, in reference to open ocean, archipelago, inland lake, man-made lake, river or reservoir, having an open surface exposed to wind effect for sustaining water waves and collecting energy as wave motion to establish an energy reserve. Marine surface layers, in particular, are exposed to high-speed wind which produces water waves and increases the size thereof by its friction.

In this application, the term "wave energy" is used in reference to mechanical motion of water occurring in almost any direction, to oscillation or to an accumulation wave of several waves, i.e. interference. In wave motion, the molecules of flowing water migrate in one direction or back and forth along an almost regular path in an alternating transition of at least two different energy forms, the energy passing this way through the water.

In this application, the term "form factor k" is used in reference to the proportion of a flow resisting force provided by a particular form. An experimental study on the resistance to motion in a current provided by various forms has been presented in a Finnish textbook High School Physics (Nurmi-Ahlman-Fedosov-Höglander-Qvickström) in 1961. Measurements were conducted with air by doctor Uuno Nurmi and are shown in FIG. 1 for form parts a . . . f. The resistance to motion is mainly due to turbulence downstream of the parts. Projected areas in a plane perpendicular to current are equal and other factors are also constant. The formula of a resistance force F for surfaces of various contours is shown at the bottom of FIG. 1. The resistance force is obtained by multiplying the form factor k by the density of a substance in flowing or oscillatory motion and by the part's projected area perpendicular to current and by the square of speed of motion. The coefficient resulting from a specific form is presented as the form factor k on the right side of the figure, the current coming from the left as illustrated by arrows.

In this application, the term "structurally solid" is used in reference to a material substantially impervious to gas or liquid, e.g. a composite structure, which is generally smooth in its surface and light, yet capable of resisting major forces and various types of abrasion.

The form values of FIG. 1 apply not only to air but also roughly to water, even though the density of water is about 1000-fold with respect to air. Because of the difference in density, the wind power is indeed recovered more effectively by small equipment from the waves of a waterway than from air. The forces of water are much more powerful in a small space than those of air. Liquid water has also a powerful inertial and centrifugal force.

A novel apparatus of the invention for reclaiming energy from sea waves directly as electricity by means of a generator is more reliable in operation than e.g. a traditional windmill, since the marine "action", i.e. the oscillatory motion of waves, continues for a long time in response to inertial forces, even after the wind has calmed down, especially in deep water. The reflection of marine waves and the deflection of a wave front increase the continuity and duration of energy production, e.g. behind islands, even though the perceivable kinetic energy of water decreases. The magnitude of masses alternating in wave motion ensures a continuity in energy production, even though the water molecules or liquid "aquatic nuclei" usually orbit along paths which are circular or elliptical in a longitudinal section taken in the propagation course of waves.

Eventual applications of the invention cover all sectors of society which use or consume energy, e.g. traffic, housing, industrial production. Benefits include major cutbacks in raw materials and emissions of all sorts.

The invention is also workable as an anti-wave method and apparatus capable of "eating up" or eliminating water waves by combining the forces existing in water waves. Such an "anti-wave apparatus" generally establishes a quiescent surface of sea water in energy production, since the usual swell-producing force of preceding waves is spent for driving a generator shaft and producing electricity. The rotating speed of a turbine may reach quite a high rate in response to the height or the high frequency of multiple rolling waves. The invention is also workable at a low oscillation energy, i.e. a low amplitude, or at a high frequency, e.g. by virtue of the streamlined V-shape of vane elements or the summation of power from several waves.

The wave "eaters" are also functional as effective breakwaters or energy-producing piers without major construction operations and expensive extra equipment.

The invention is also useful as a source of energy for ships in propulsion or as a course smoother at high seas, where the oscillating swell is usually powerful and ships have a tendency of pitching and rolling. Hence, at an appropriate distance to precede the vessel, it is possible to arrange, e.g. at the end of a lengthy pole, a small propellable apparatus of the invention, which suppresses waves and claims energy from marine swells in the form of electric power for the propulsion of a traditional ship, a hydrofoil or a hovercraft, e.g. even at high propeller speeds.

The reverse action of waves may have an impact even at distant places. In fact, marine wave energy can be recovered even from an extensive area effectively from spots that are few and far between, as the oscillation propagates in water effectively and soundlessly to desired collecting spots, especially in long, high-energy carrying waves. As a result of the equalization of energy, the kinetic energy from waves in the proximity of calmer areas always transfers by propulsion or attraction into the calmer areas. The propelling motion of a wave, along with its inertial forces, can be guided by way of the vanes and power shaft of a turbine to a generator, in which the electromagnetic resistance forces must be overcome by working. The kinetic energy of a wave, once delivered into a generator, is no longer capable of generating a new wave in water, but what occurs is breaking of the wave without creating a new rising wave.

In most cases, the wave motion is almost symmetrical. The reverse propagation courses of a wave become readily comprehensible, when, for example, the wave motion created by tossing a pebble in quiescent water and propagating apparently away from the strike point, and the deflected or reflected wave passing in a reverse direction or inwards, are almost identical in terms of the energy distribution thereof.

Almost the entire energy of a wave front can be focused by means of an apparatus of the invention within the proximity of a power shaft 3 even from an extensive area. As a result of a true oscillatory motion performed by the molecules of water waves, there is also a return phase in the wave supplying the turbine shaft with more power at a surface inclined in the same sense of rotation. Wave motion has always an inclination to work its way to a waveless area. A turbine does not "know" the direction a wave is coming from, since currents and oscillations in all directions generally increase a rotative force on the turbine power shaft 3 in the same direction. The symmetry and double-faced design of a turbine often also facilitate a simple rotation of 180 degrees and a take-up of force even in just partially open V- or A-shapes of the vanes in a pair of vanes. With the waves of water remaining almost stationary with regard to molecules and the wave energy moving in an alternating oscillatory motion, an apparatus of the invention enables both directions of oscillation to be converted into electrical energy. In the interference of waves, all frequencies and wavelengths can be exploited. The apparatus has generally its rotating speed adjusting itself in a natural way. The circular waves, as described in reference to tossing a pebble, are functional also in the opposite sense.

The placement of electrical equipment in water can be implemented e.g. in air- or vacuum-insulated boxes sort of like a thermos bottle, for example in an apparatus with a horizontal shaft, the powerful motions of a wave surface being guided into a wave "eating" apparatus, for example through a slot 4 between vanes 1 and 2, or into any depression or recess of the vane for taking up the force.

Each alternating individual wave brings about a horizontal and vertical motion in the sea, which can be exploited in both directions by a turbine in the production of electricity. Thus, the recovered total energy of multiple bidirectional waves is much greater overall than the amount of short-term unidirectional energy recovered e.g. from the reservoirs of tidal power facilities. Indeed, the waves of waterways provide an energy output which surpasses the total output of existing hydropower. In reality, there is no such thing as energy shortage in the world at all, despite the fact that oil and coal reserves will be exhausted someday. The continuing marine waves provide an energy reserve sufficient for all people.

The water eddy in free vortex motion develops an air core at the centre and a high speed of rotation as the static pressure of water transforms into a small-radius velocity while retaining the moment of momentum. A high centrifugal force separates light gases from water in the inner curve side of the motion. A high-speed cyclonic vortex creating the centrifugal force is generally brought about by means of a narrowish tangential flow feeding slot from a reasonably extensive range relative to the shaft, even at a low speed. The adjoining or successive vortices can be set to lean on each other for a vortex field, unless there is a wall between the vortices.

The utility aspect of the invention is enhanced by using a three-phase frequency converter in the generator for producing high electric powers. A permanent magnet and direct current can be used for a free regulation of rotating speeds along with the mechanical energy reserve of gyro-forces.

PRIOR KNOWN EQUIPMENT

The Finnish jerking Savonius rotor has been patented with a Finnish patent and U.S. Pat. No. 1,697,574, which relates to air current in the wind. Marine wave energy has been discussed in U.S. Pat. No. 6,622,483 and U.S. Pat. No. 4,221,538. These make use e.g. of air pressure and the squeezing of waves into a bottleneck by special deflectors. The prior known equipment has many drawbacks which can be eliminated by means of this invention, e.g. by simplifying the construction and by enhancing the intake of energy in proportion to the size of an apparatus. A drag anchor is disclosed e.g. in U.S. Pat. No. 4,733,628. A multitude of wind turbines have also been described, but those have been low in performance.

The publication WO 96/38667 deals with the exploitation of wave energy by using a pair of form parts or a cluster of form parts, having a droplet shape in cross-section. Neither is this apparatus capable of taking full advantage of the specific motion of waves in an efficient manner. The force take-up area is small with respect to the rotor's diameter. Neither is the form factor difference of a droplet shape in opposite directions of flow sufficient to compensate for this drawback.

The following figures are only intended as examples and to illustrate a function of the invention.

FIG. 3 shows a section perpendicular to a power shaft 3 at various depth levels, depicting an apparatus in which two form parts, in the cross-sectional shape of a circular arc, are provided according to the invention in a combined concave (Ko) and convex (Ku) form on various sides of the power shaft 3 with (FIG. 3b) and without (FIG. 3a) flow lines. The form parts lie in a position circled by 180 degrees around the shaft in a solid spiral apparatus.

Figure 4:
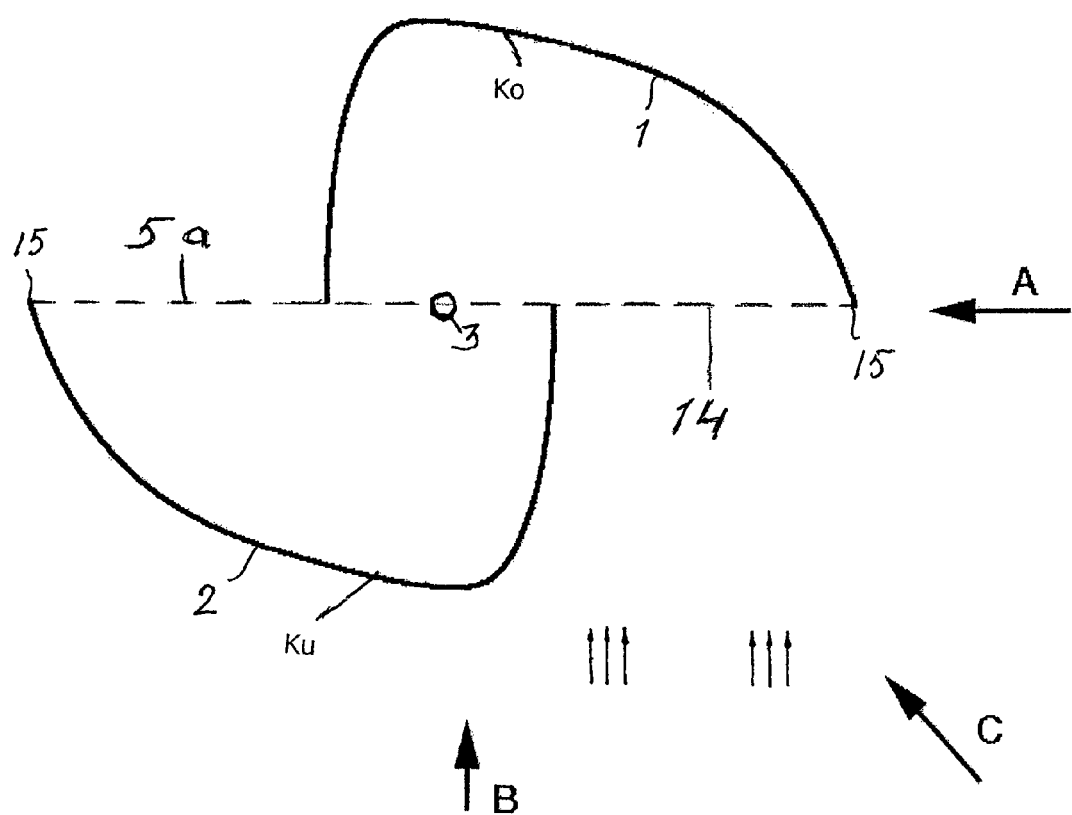

FIG. 4 shows a section of one spiral form surface of the invention, circling around the shaft 3, as concave (Ku) and 180-degree reversed convex (Ku) shapes in a current shown by small arrows.

FIG. 5 shows the overall shape of a streamlined brace 5a movable in sea water, often comprising a hollow or porous shell structure or a solid support beam securing the vanes' extreme ends e.g. to a hollow durable power shaft 3.

Figure 6:
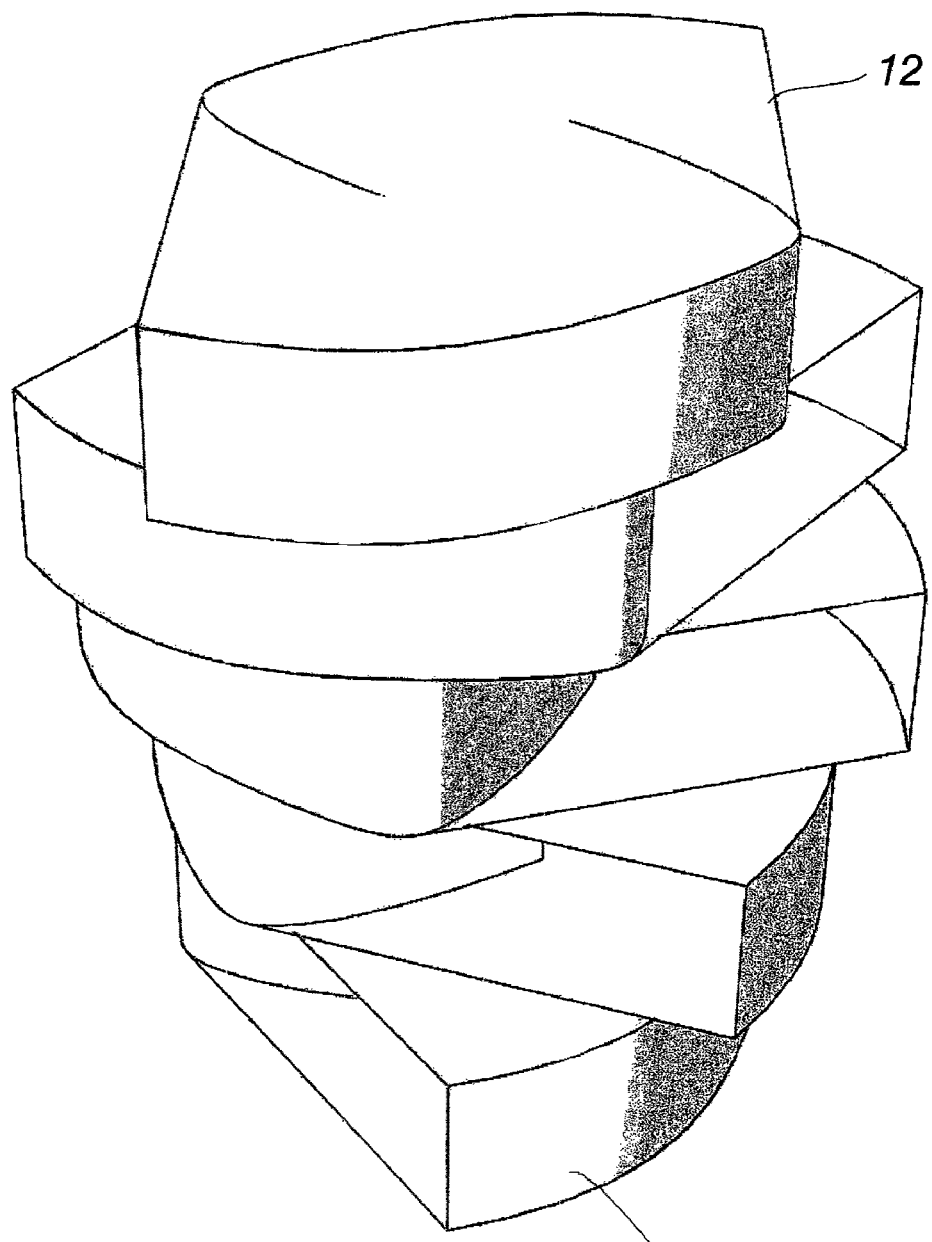

FIG. 6 shows the making of concave and convex form parts 5 from shapes carved in massive elements, by gluing to each other and by incorporating a spacer plate for transmitting a force to a power shaft.

Figure 7:
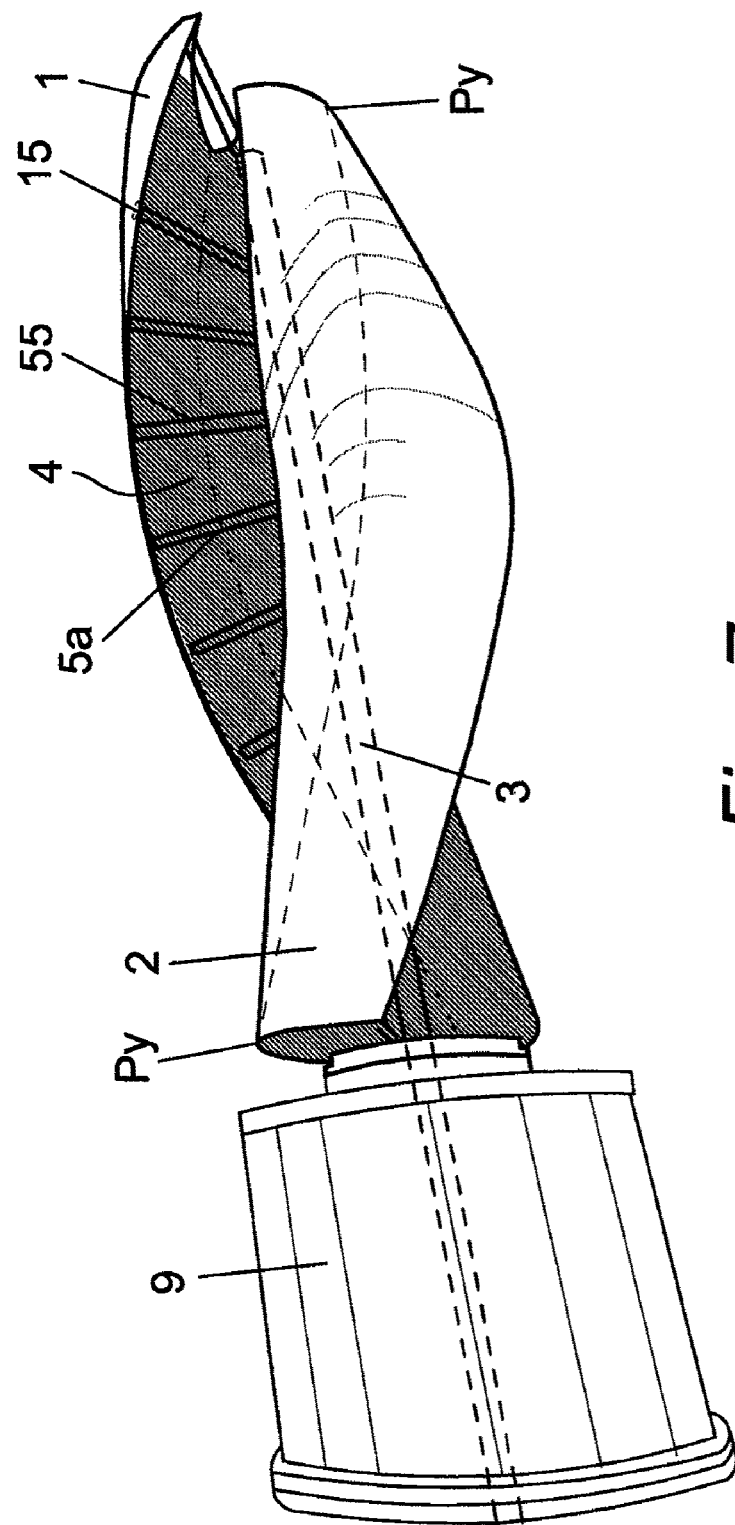

FIG. 7 shows from below or optionally from above a turbine attached to a horizontal power shaft 3, which is provided with an open helical slot or opening 4 and an underwater or occasionally overwater pair of form parts consisting of V-shapes, the V-form of which is generally rounded (Py) but can also be more or less sharp-pointed. The turbine is used for eliminating a powerful horizontal motion in the vicinity of water surface.

Figure 8:
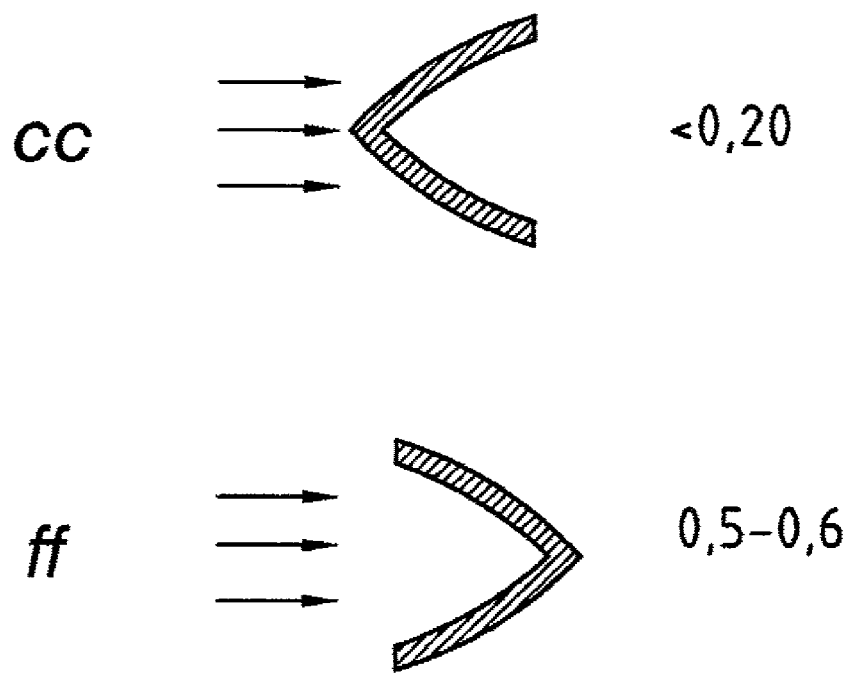

FIG. 8 shows flow resistances for novel open double-faced V- and A-shapes and approximate form factors therefor.

FIG. 9 shows a pair of form parts of the invention in section at various depth levels in current layers of various directions and speeds with (FIG. 9b) or without (FIG. 9a) flow lines. The form parts have an apically rounded (Py) V-shape.

FIG. 10 shows in fragmentary views A, B and C the making of a flow vane or form part 1 and 2 from a cross-sectionally closed pipe A, by diagonally cutting in half relative to the power shaft to form two helical parts B and C while circling 180 degrees around a centre axis 3.

Figure 1:
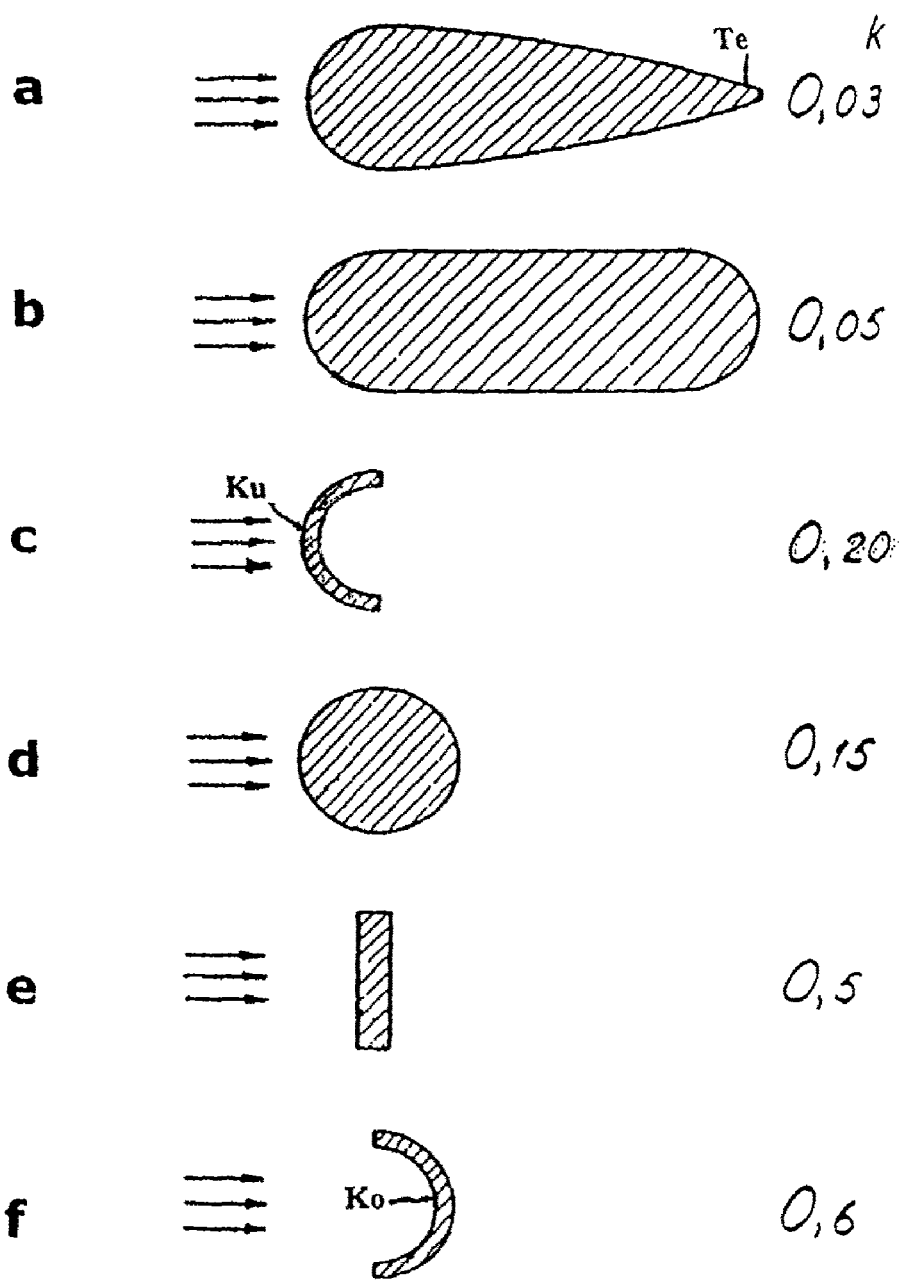
FIG. 1 shows experimental flow resistance measurements conducted in Finland with air for a number of forms identical in size.

FIG. 1 illustrates experimental measuring results obtained in Finland for the form factors of a flowing medium, as an example for a few forms a . . . f in one course of flow from left to right, as indicated by arrows in the figure. The formula of a flow resistance force F is presented below the fragmentary view f. In view c, the current comes to contact with a convex (Ku) shape and in view f with a complementary concave (Ko) shape. The only difference is a 180-degree shift in the parts' position, but one has a 3-fold flow resistance because of the form, even though the parts are equal in terms of their projected areas.

The effect of a downstream current on flow resistance can be observed between parts a . . . d as the current strikes against an identical convex (Ku) shape. The form factors k display substantial differences as a result of interfering turbulence in the trailing edge flow.

The highest resistance to motion among round-nosed parts a . . . d of equal projected areas is displayed by the part c, which produces powerful downstream turbulence. The highest resistance of those presented is displayed by the part f, which in terms of its resistance in water is equal to a drag anchor. The entire generator, and particularly the stator and shaft, can be anchored, if desired, in deep water for example by means of an in-situ rotating, upward opening cup for preventing a vertical uplift. Horizontal motions can be precluded e.g. by means of drag anchors, which take up horizontal forces and which are placed as anchors e.g. in the directions of a rotation radius or a tangent of the shaft. The sizable drag anchors installed in divergent directions may secure the entire apparatus, and especially the shaft, statically in place. In this case, the anchoring is effected to a huge body of water, not the usual way to the sea floor.

The lowest resistance in FIG. 1 is displayed by the streamlined, almost droplet-shaped part a, which has a sharp (Te) trailing end. The convergent streamlined trailing end (Te) reduces flow resistance in all forms. The part a obtains its form factor 0.03 in cooperation with a rounded convex (Ku) leading end. If the leading end were designed with a sharp point the way of a kayak, the resistance would be even lower. This also begins to resemble in shape the sharp jaw of fast-moving fish, e.g. pikes, in water. The convex (Ku) round bow shape of submarines in FIGS. 1a . . . d does not, according to experiments, provide a favourable resistance to motion as compared to sharper forms.

When experimental convex (Ku) parts a . . . d are compared to each other, it can be noted that increasing the length alone does not provide much increase in flow or motion resistance, despite the increase of friction surface. The shape of a trailing end is more meaningful in current. Indeed, the trailing ends of aircraft wings and fuselage are generally sharp (Te), the leading ends being generally rounded (Ku, Py) for precluding, among others, the alternating distribution of flow, i.e. oscillation, on either side of a sharp dividing edge. This enables avoiding a soundpipe effect in current.

In tests conducted by the Applicant in a pulp mill, it was found that the fibers of aqueous slurry adhered to a sharp edge, but the convex (Ku) rounded shape (Py) remained clean.

Displayed below the part f is the formula for a resistance force as expressed by the form factor k, the density of a medium, a projected area A perpendicular to current, and a motional speed v.

Figure 2:
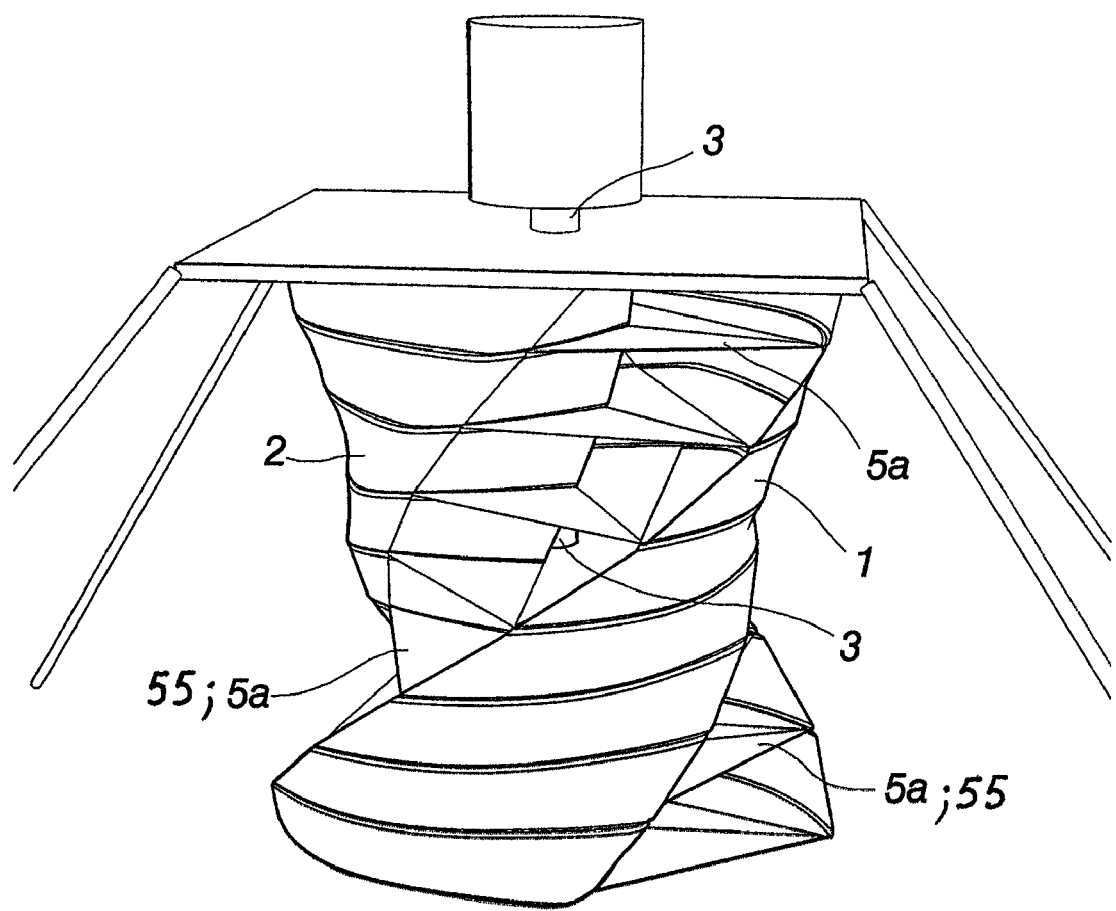
FIG. 2 shows a slightly oblique downward side view of one apparatus of the invention capable of resisting high forces, which is assembled from elements under a floating and rolling pontoon platform as seen in a direction C indicated in the sectional view of FIG. 4.

FIGS. 2 and 3 show an illustrative and a sectional view, respectively, of a pair of concave and convex vanes 1 and 2 of the invention for a turbine, wherein the convex (Ku) and concave (Ko) shapes are connected by rotationwise streamlined braces 5a to a power shaft 3 highly resistant to forces, which can be made e.g. in light and high-strength titanium metal non-oxidizing in water.

If the vane shape is a V-shape consistent with FIG. 9, the vanes' leading edges must usually be rounded (Py) in the style of the leading edge of an aircraft wing for precluding oscillation. The rounded (Py) shape is also beneficial in a current lateral to a rotating rotor.

The vane 1, 2 may also have a U-shape consistent with FIG. 3 or a shape of changing curvature shown in FIG. 4, in which the vane edge closer to the power shaft 3 makes a steeper curve towards the other vane. This enables creating quite a sharp, effortlessly water splitting shape resembling the sharp jaw of a pike. The concave shape circles continuously for 180° and transforms thereby at a distance codirectional with the power shaft 3 into a convex form, as the viewing or flowing direction remains the same. Respectively, the convex shape presently on the opposite side of the power shaft circles for 180° and transforms into a concave form.

FIG. 3a shows in section an arcuate concave (Ko), partially U-shaped and on the other side an arcuate convex (Ku), flow-barrier establishing fixed pair of vanes 1 and 2 on either side of a power shaft 3. When proceeding in the axial direction of the power shaft 3 from one end of the vanes to the other, the vanes are preferably extending helically over 0-180 degrees. The flowing water fills first the concave channel shape, which is screened in the figure. Subsequently, this flowing water may proceed forward in the same channel as rotation is made around the power shaft 3. The power shaft can be porous or hollow. A thicker middle portion 5 of the brace 5a provides a strong engagement surface for the power shaft 3, which can be a hollow or porous screen-like shaft partially pervious to and carrying aquatic gases along its centre line in the longitudinal direction of the shaft.

A helical turbine can be assembled in such a way that a robust shaft 3 has threaded thereon lightweight support plates 5, which are provided e.g. with shaft-accepting holes and are possibly porous in the middle and which are pivoted around the shaft radially. A ready-to-use spiral-shaped vane member 1 or 2, provided with an appropriate pitch, is attached to suitable spots e.g. with screws 15 or other fasteners. The spiral pitch, depth or the vane height may change in axial direction. This is beneficial especially in a vertical shaft rotor, because wave motion dies down gradually as the depth of water increases and the mass of moving water increases and the amount of air intermixed with water decreases. The helical channel or ridge surface in an inclined position relative to the shaft is able to take up also axially directed forces from the inertia of a wave mass.

FIG. 4 shows, in section perpendicular to the power shaft, a pair 1 and 2 established by concave and convex form part surfaces. A streamlined support beam 14, 5a enables transmission of forces to a shaft 3 even from extreme ends 15 of the concave (Ko) and convex (Ku) vanes 1 and 2. The apparatus according to FIG. 4 can be designed with a horizontal shaft or in a vertical configuration.

Current may reflect from the convex surface (Ku) towards the concave surface (Ko). The vanes 1 and 2 may have its braces 5a in a streamlined design and low in resistance, for example, as shown in FIG. 5, in a porous or hollow design for removing the air from waves.

The concave (Ko) and convex (Ku) surfaces may vary in curvature as required in various parts of the apparatus and in various depths. The molecules of marine waves are most mobile in horizontal direction near the surface, generally in response to the friction of wind. This is why the pressure-receiving concave form surface is positioned in that layer for a large or small rotation radius. The entire power shaft 3, along its entire length, receives therefrom a high force or a high velocity from the inertial forces in the mass of water. It is preferred that the rotating shaft be set in a generally horizontal position transversely against multiple waves, such that the powerful waves moving near the surface apply the inertia thereof to provide a turbine or generator rotating around the shaft with powerful or high-speed rotation, depending on the length of a moment arm. Even the return phase of a wave drives the shaft always in the same direction after a 180-degree rotation.

During the course of its swirling, the water eddy develops a hydrocyclonic separating effect like the one in an ordinary lavatory sink, as the water is draining along with its air core and high centrifugal force near the air core. According to our experiments, high-speed thin axially directed currents towards the surface also occur in this process. Placing turbines of the invention alongside each other or in succession enables developing a cyclone field separator, in which the adjacent or successive cyclones have usually the same direction and speed of motion as the cyclones themselves are leaning against each other. Feeding the apparatus can be readily effected tangentially e.g. near the surface for creating a cyclone vortex separating into a space between the shafts.

FIG. 5 shows an illustrative view of braces 5a, which are attached to the power shaft 3, which are set between the edges of the vanes 1 and 2, which are low in resistance to motion and which are hollow or solid and movable in sea water 7. Hollow or porous pipes enable the removal of e.g. air dissolved in water. The leading edge of a vane or brace is often rounded and quite thick, as well as converging in the direction of motion. The vanes 1 and 2 can be fastened for example with screws to the braces 5a at the extreme ends 15 (FIG. 3a). However, the manufacturing process is facilitated by the symmetrical brace or beam 5a which is independent of flowing direction.

The apparatus can be manufactured by using the vane's 1 and 2 cross-sectional contour as a mould, such that the mould has performed a spiral sliding and produced a spiral part of matching shape. The spiral parts are mounted on a rotating shaft in such a way that one side of the shaft carries a concave surface and the opposite side carries a complementary convex surface.

FIG. 9a shows a pair of vanes 1 and 2 in a section perpendicular to a power shaft 3, the vanes of said pair having a concave V- or A-shape with a rounded (Py) point. The vanes jointly constitute a double-faced, spiral-shaped, solid V-helix structure around the power shaft 3. Just like in FIG. 3a, this solution displays a concave and convex shape, yet in a shape penetrating like a spearhead into a current depicted with lines. In the crosswise direction, the extension modelled as a sharp "pike jaw" generates on either side of the shaft 3 equal divergent resistances in current, so rotation is not disturbed.

The V-shaped arrowhead form facilitates movements of the part in water, especially in a countercurrent. In the reverse direction, the flow resistance is particularly high in the opening 4 between the vanes' 1, 2 edges.

The resistance of a concave inverted V in a current is approximately equal to what is shown for the part f in FIG. 1 in the illustrated direction (0.6), while the resistance of a convex V-shape is approximately equal to what is shown for the part c (0.20) in the same direction. Thus, the effect of a shape is about 3-fold over a rotation of 180 degrees. A similar type of difference in resistance is achieved by V-shapes more prominently in various directions of flow, as the sharp splitting point cuts through sea water more effectively than an arcuate form e.g. in specimens a-d.

The horizontal motion of marine surface waves can be squeezed by its inertial forces in through a horizontal opening 4 in the horizontal turbine shown in FIG. 7 and brought to drive a power shaft in the propagation direction of a wave. During a circular motion around the shaft, a countercurrent section or still water is also encountered, wherein the sharp or rounded V-shape assists in splitting and cutting the water as the inertial forces of wave motion are taken up by an open form. Over the next cycle, the same is repeated always in the same direction. Not much counterforce is found in a V-shaped horizontal shaft turbine to oppose the powerful motion of a water surface wave. Consequently, the rotating speed becomes high. FIG. 7 depicts a horizontal shaft apparatus of the invention with arcuate vanes, along with its generator 9.

FIG. 9b shows a section consistent with FIG. 9a, a portion of view having flow lines added therein. The sharp, rounded, elongated points (Py) create flow resistances in a lateral or crosswise direction, which are equal in what is a short-term current with respect to what is shown in unbroken lines in the figure, so the circular motion around the shaft 3 is not disturbed.

FIGS. 10 A, B and C illustrate a principle of manufacturing the vanes from a closed pipe of arcuate cross-sectional shape by cutting diagonally in half while turning 180 degrees so as to form helical concave (Ko) and helical convex (Ku) surfaces, which are generally identical. Using a commercially available tubular or V-profile facilitates manufacturing of the apparatus. For example, a composite material is practical and readily attachable to the bracing beam 5a.

Helical elements B and C can also be manufactured on top of a mould efficiently in mass production e.g. from a composite material so as to create an appropriate 180-degree helix and a light and durable shell structure, the concave and convex sections A and B of which, in attachment to the shaft 3 by means of the beams 5a, can be used to provide a double-faced structurally solid pair of form parts, the form parts of which have a major difference in terms of the form factors thereof.

In FIG. 6, the forms are carved in massive elements 12, placed perpendicularly to the rotation axis and attached to each other successively in the direction of the shaft for stepwise staggered positions relative to each other for creating a helical concave and convex form. Between the elements 12 there may be spacer plates, which are first attached to the shaft and to which the elements 12 are then secured.

The rotating speed of a pair of form parts is typically a multiple of the marine wave frequency, which enables recovering energy even from long waves in both flowing or oscillating directions of the wave current.

A marine wave is comparable with the force of flow in a river, which flows first in one direction and momentarily returns in an opposite direction. With the invention, this force of an alternating flow can be exploited in both directions of motion.

FIG. 7 shows an illustrative view of a rotor, which is provided with a pair of crosswise placed, helical vanes 1 and 2, which is attached to a horizontal power shaft 3 and takes up the hydraulic force of a powerful, high-mass surface wave, said pair establishing a helical slot or opening 4 between the edges of its vanes. The surface waves force themselves by inertial forces inside the rotor through the opening or slot 4 near the surface, setting the power shaft 3 in rotation below the surface or above the surface provided that the power shaft can be retained stationary e.g. by pulling with drag anchors to a stationary layer of water. A lower-placed reverse motion of the rotor, resulting from rotation, is established by a low-resistance sharp or rounded (Py) V-shape. As the turbine is rotating, the openings 4 keep emerging from water ready to take up with an open V-shape the kinetic force of a powerful surface wave. Downstream of the V-opening, the vane panel develops a ridge of a complementary shape, as illustrated by a line Py-Py. This ridge is generally rounded for precluding oscillation. The electromagnetic resistance forces of the generator 9 are offset by the inertial forces of a water wave mass and converted into electricity. The force is conveyed to the shaft e.g. by means of streamlined braces 5a or by means of support plates or partitions 55, which are orthogonal to the shaft and crosswise to the shaft, i.e. extending in the propagation direction of a wave. Due to the open V-shape, a high-speed rotation can be achieved in the powerful motion of a surface wave, as the lower-placed reverse motion of the rotor proceeds easily because of the shape of a sharpish point.

Parallel turbines, e.g. like the ones shown in FIG. 7, can be placed at sea in an overlapping staggered configuration in order to not hinder ship traffic on the surface.

A long power shaft 3 can be provided with a conventional universal joint or by using e.g. a flexible twisted metal-stranded axle for making low-gradient turns in transmission (not shown in the figure).

In the event of major overflow, a big wave may run over or under the entire rotor in order to avoid damage or overspeed. The transmission of force from vanes to a power shaft 3 can be implemented e.g. by means of streamlined braces 5a or e.g. by means of support plates 55 more or less orthogonal to the shaft and codirectional with wave motion.

High-speed surface motions can be preferably "skimmed" by means of a horizontal shaft underwater or optionally overwater water wheel or paddle wheel, i.e. a turbine, and by means of a watertight generator 9 for electricity, as air provides little or no resistance at all.

Major forces are transmitted from the proximity of the water surface to the generator's power shaft 3 by means of robust, shaft-mounted support plates 55 extending in the propagation direction of a wave. A space between the plates 55 can be used, if desired, for mixing air and water with each other and even to provide some foaming. The shaft's 3 watertightness in the bushing is generally ensured by a small oil ring or special plastics.

FIG. 8 shows exemplary flow resistances and form factors k for novel double-faced cross-sectionally slightly arcuate or straight open V- or A-vane shapes cc and ff in a rotating rotor, which is e.g. consistent with FIG. 7 and rotates around the shaft 3. Massive waves enter by way of the opening 4 and by their inertial force bring the rotor to intense rotation, but the rise of a new wave hardly occurs any longer as the energy has been spent for working up electricity in the generator. A rounded U-shape is also possible, but in that case the resistances are higher, especially in a reverse counterflow of the rotor, unless use is made of a sharpish water-splitting "pike jaw-shape".

The torque or rotating speed applied by a pair of form parts 1, 2 to a power shaft 3 can be enhanced or reduced by changing the length of a moment arm between the form parts and the power shaft in various phases of wave motion or at various depths in water layers of dissimilar flowing characteristics. This can be implemented e.g. hydraulically by means of telescopic poles. Spring-equipped telescopic poles provide for a self-actuated regulation of the torque and rotating speed.

The apparatus can be retained in a desired depth by means of pontoons, the buoyancy of which is adjustable for controlling the apparatus' draft and thereby optimizing the performance in terms of a presently available multiple waves. The buoyancy of pontoons can be adjusted e.g. by pumping air or water ballast.

The apparatus can be anchored to a depth at which it is partially or entirely above the surface of water at the troughs of waves and entirely submerged at the crests of waves. In high multiple waves, the apparatus may be bobbing up and down with the waves. However, the amplitude of this vertical motion may be less than the height of the wave.

What is claimed is:

1. A method for producing electrical energy from an energy reserve established by marine waves in alternating motion, which is recovered gradually for use directly as electricity by means of a difference in flow resistance form factors by using a pair of form parts engaged with a power shaft, wherein the pair of form parts are double-faced and structurally solid, and each form part has in cross-section the shape of an open V, the open V having legs intersecting to form a ridge on an outer side of the open V and a groove on an opposite inner side of the open V, the inner side of the open V bounding the space between the legs of the open V, each form part extending helically around the power shaft by 180+180 degrees, and being rotated by the kinetic energy of waves through reversing the form parts' form factor always at 180-degree intervals, the power shaft being supplied with force in both directions of alternating wave motion as the pair of form parts has its halves alternately presenting low and high resistances to flow.

2. A method as set forth in claim 1, wherein the rounding of a sharp point in the V-shape is used for precluding the adherence of filamentous particles or the oscillation of flow.

3. A method as set forth in claim 1, wherein a concave channel shape between the V-legs of each form part takes up the inertial force of wave motion and a convex ridge-shaped contour surface of the V-legs initially shields the concave channel shape at least partially in a current and deflects the current aside from the concave contour surface.

4. A method as set forth in any of claims 1-3, wherein several various force components of a current, especially both directions of a wave current, are combined to provide a rotative motion for the power shaft, which is either horizontal or vertical.

5. A method as set forth in claim 1, wherein especially waves of long wavelength, i.e., the waves of low frequency, are transmitted by the pair of form parts for a rotative force on the power shaft, whose rotation is opposed by the electromagnetic forces of a generator.

6. A method as set forth in claim 1 wherein a difference in the resistance of the form parts is established by increasing or reducing the length of the form parts in the direction of motion.

7. A method as set forth in claim 1, wherein a trailing edge of each form part is designed as an edge of an open V-shape which in its rotation takes up current repeatedly, the trailing edges of the form parts defining between the form parts an opening whose circumferential dimension is less than the circumferential dimension of each form part.

8. A method as set forth in claim 1, wherein the torque or rotating speed applied by the pair of form parts to the power shaft is enhanced or reduced by changing the length of a moment arm between the form parts and the power shaft at various phases of wave motion or at various depths in water layers with dissimilar characteristics of flow.

9. A method as set forth in claim 1, wherein the pair of form parts functions as a cyclone separator for gases intermixed with water.

10. A method as set forth in claim 1, wherein a wave front is focused or guided towards the pair of form parts, by which the waves are eliminated or suppressed, whereby the force of multiple waves is reduced not only in the immediate sphere of action of the form parts but also elsewhere.

11. A method as set forth in claim 1, wherein the form parts function to establish a near-surface, wave-soothed layer in the sea by converting the inertial forces of a wave into electricity generated by a generator.

12. A method as set forth in claim 1, wherein the recovered energy is used as a source of energy in marine and rail traffic or in energy supply for society.

13. Wave power apparatus for gradually converting marine wave energy directly into electricity, said apparatus comprising a power shaft, an electric generator driven by the power shaft, a pair of form parts mounted on the power shaft, each form part of which has a first form factor proportional to flow resistance in a first direction of flow and a second form factor in a reverse direction of flow, said form parts translating kinetic energy present in the inertial force of waves into power shaft rotating energy on the basis of a difference in the form factors of the form parts, wherein the first form factor is established by a concave surface of the form part and the second, substantially lower form factor is established by a convex surface of the form part, and wherein the pair of form parts constitutes a double-faced continuous or stepwise proceeding helical concave and convex form around the power shaft, each form part having a cross-sectional shape of an open V, the open V having legs intersecting to form a ridge on an outer side of the open V and a groove on an opposite inner side of the open V, the inner side of the open V bounding the space between the legs of the open V.

14. An apparatus as set forth in claim 13, wherein the pair of form parts includes durable and light shell elements connected to the power shaft, which both extend helically 180° around the power shaft on the opposite sides of the power shaft.

15. An apparatus as set forth in claim 13, wherein the shapes of the form parts are carved in massive elements set orthogonally to the rotation axis and connected to each other for creating a concave and convex shape.

16. An apparatus as set forth in claim 13, wherein each form part is attached to braces which are attached to the power shaft, the edges and braces of each form part being rounded in what is their leading or lateral edge in the motion direction of rotation.

17. An apparatus as set forth in claim 13, wherein each form part is reduced in thickness in the motion direction of a rotating part.

18. An apparatus as set forth in claim 13, wherein the direction of the power shaft deviates from the direction of the form parts' edges.

19. An apparatus as set forth in claim 13, wherein the form parts have their edges secured by screws or the like fasteners to streamlined braces (5a) or to a support wall rounded at its edge.

20. An apparatus as set forth in claim 13, wherein the horizontally installed power shaft is set in alignment with a wave front, whereby the apparatus can be overrun or underrun by large waves without being broken.

21. An apparatus as set forth in claim 20, wherein several power shafts are coupled axially in succession by a universal joint or a metal-stranded wire.

22. An apparatus as set forth in claim 13, wherein the apparatus is anchored to a depth in which it is partially or entirely above the water surface at the troughs of waves and entirely submerged at the crests of waves.

23. An apparatus as set forth in claim 13, wherein the apparatus is retained in a desired depth by means of pontoons, whose buoyancy is adjustable for controlling the draft of the apparatus and for thereby optimizing the performance in view of the available multiple waves.

24. A paddle wheel connected to an electric generator, wherein the paddle wheel is moored and braced to the sea floor near the water surface either underwater or partially overwater, and that the paddles of the paddle wheel have the configuration of an open V-shape and the rotating shaft of a rotor consisting of such paddles is codirectional with a moving wave front, i.e. the crests of waves, and takes the rotative force from a current circling inside the wave and applied between the legs of the V-shape, the legs of the V-shape intersecting to form a ridge on an outer side of the V-shape and a groove on an opposite inner side of the V-shape, the inner side of the V-shape bounding the space between the legs of the V-shape.

25. An apparatus as set forth in claim 13 or a paddle wheel as set forth in claim 24, wherein a generator driven by the pair of form parts or a paddle wheel is waterproofed by the overpressure of some gas.

26. An apparatus as set forth in claim 13 or a paddle wheel as set forth in claim 24, wherein the apparatus or paddle wheel is placed on an offshore platform.

27. The use of an apparatus as set forth in claim 13, such that the apparatus is propelled in water in front of a vessel and a waveless or low-wave layer is established for the vessel or other watercraft.

* * * * *